United States Patent
Morrissey et al.

(10) Patent No.: US 6,461,495 B1
(45) Date of Patent: Oct. 8, 2002

(54) PROCESS FOR THE REMOVAL OF SULFATE IONS FROM AN ELECTROLYTE

(75) Inventors: Patrick John Morrissey, Middlesex; Philip John Mitchell, Leicestershire; Stewart Ernest Male, West Sussex, all of (GB)

(73) Assignee: Regenesys Technologies Limited, Wilts (GB)

( * ) Notice: Subject to any disclaimer, the term of this patent is extended or adjusted under 35 U.S.C. 154(b) by 0 days.

(21) Appl. No.: 09/743,639

(22) PCT Filed: Jul. 2, 1999

(86) PCT No.: PCT/GB99/02103
§ 371 (c)(1),
(2), (4) Date: May 21, 2001

(87) PCT Pub. No.: WO00/03448
PCT Pub. Date: Jan. 20, 2000

(30) Foreign Application Priority Data

Jul. 13, 1998 (GB) .............................................. 9815173

(51) Int. Cl.⁷ ........................... H01M 8/04; H01M 8/18
(52) U.S. Cl. .......................... 205/687; 429/14; 429/15; 429/17; 429/21
(58) Field of Search ................................ 205/687, 536; 429/14, 15, 17, 21

(56) References Cited

U.S. PATENT DOCUMENTS

| 4,485,154 A | 11/1984 | Remick |
| 4,556,463 A | 12/1985 | Minz |
| 4,586,993 A | 5/1986 | O'Brien |
| 4,747,917 A | 5/1988 | Reynolds |
| 5,108,722 A | 4/1992 | Ruthel |
| 5,126,019 A * | 6/1992 | Rutherford et al. ......... 205/536 |
| 5,176,801 A | 1/1993 | Szanto |
| 5,587,083 A | 12/1996 | Twardowski |

FOREIGN PATENT DOCUMENTS

| DE | 3216418 | 11/1983 |
| EP | 0498919 | 8/1992 |
| GB | 1107672 | 3/1968 |
| SU | 1520012 | 9/1986 |

* cited by examiner

*Primary Examiner*—Arun S. Phasge
(74) *Attorney, Agent, or Firm*—Antonelli, Terry, Stout & Kraus, LLP

(57) ABSTRACT

A method for the removal of sulfate ions from an electrolyte of an electrochemical reduction-oxidation system wherein said electrolyte comprises a halogen and in which the sulfate ions an a contaminant or interferant, which method comprises the steps of: (i) increasing the halide concentration in the electrolyte by electrochemical reduction of the halogen, (ii) crystallizing a sulfate salt out of the electrolyte, and (iii) separation of the electrolyte from the crystallized sulfate salt. An electrochemical process for energy storage and/or power delivery comprising the step of removal of sulfate ions from the electrolyte according to the above cited method is also disclosed.

30 Claims, 6 Drawing Sheets

PROCESS FOR THE REMOVAL OF SULFATE IONS FROM AN ELECTROLYTE

The present invention relates to a process for the removal of sulfate ions and, in particular, to a process for the removal of sulfate ions from an electrolyte stream containing halide ions in which they are an interferant or unwanted species.

U.S. Pat. No. 4,485,154 discloses an electrically chargeable anionically active reduction-oxidation system using a sulfide/polysulfide reaction in one half of the cell and an iodine/polyiodide, chlorine/chloride or bromine/bromide reaction in the other half of the cell. The two halves of the cell are separated by a cation exchange membrane.

The overall chemical reaction involved, for example for the bromine/bromide-sulfide/polysulfide system is $$Br_7 + S^{2-} = 2Br + S \qquad \text{Equation 1}$$

The electrochemical reaction takes place in separate but dependent bromine and sulfur reactions. When discharging, the bromine reaction takes place on the +ve side of the membrane and the sulfur reaction takes place on the –ve side of the membrane. The reaction goes from left to right and metal ions flow from the –ve side of the membrane to the +ve side of the membrane to complete the circuit. When charging occurs the reaction goes from right to left and metal ions flow from the +ve side of the membrane to the –ve side of the membrane to complete the circuit. During extended cycling of the cell anionic species diffuse through the membrane. Thus, although a cation. selective exchange membrane is used, sulfide ions diffuse from the sulphide/polysulfide electrolyte into the bromine/bromide electrolyte where they will be oxidised by the bromine to form sulfate ions according to the reaction scheme below.

$$HS^- + 4Br_2 + 4H_2O = 8Br^- + SO_4^{2-} + 9H^+ \qquad \text{Equation 2}$$

The occurrence of this reaction is disadvantageous because the presence of sulfate ions in the bromine/bromide electrolyte can result in the precipitation of a sulfate salt. This precipitate can cause scaling within the apparatus, blockage of electrolyte ducts and contamination of the electrodes. In the system described above sodium ions are commonly used as counter-ions and so in this case sodium sulphate is precipitated.

A number of methods are known in the art for the removal of sulfate ions from solution or for the prevention of their precipitation as a salt.

The chlor-alkali industry uses a method known as "purging" wherein the solution is simply diluted to prevent the sulfate salt from reaching its solubility limit and precipitating out of solution. This method is not suitable in the present process however since the electrolyte is used repeatedly over a large number of cycles whereas in the chlor-alkali processes it may only be recirculated for a few cycles.

Another option is the addition of soluble barium hydroxide and filtration of the resulting barium sulfate precipitate which is highly insoluble in aqueous solutions. This method suffers from the disadvantages that barium salts are very expensive and their toxicity presents environmental problems on disposal. Furthermore, if too much soluble barium is added to the electrolyte it can adversely affect the cation exchange membrane by substituting onto the cation-binding groups (commonly sulfonic acid groups) causing a consequential increase in resistivity, of the membrane. Addition of a soluble calcium salt such as calcium chloride and filtration of the resultant calcium sulfate precipitate is also possible. Calcium salts are less expensive than barium salts and do not cause the environmental hazards associated with the use of barium. However, calcium sulfate is some 1200 times more soluble than barium sulfate, increasing the risk of damage to the membrane and making the process less efficient for reducing the concentration of sulphate. U.S. Pat. No. 4,747,917 discloses a process which includes adding a brine-soluble calcium salt to a brine solution in order to reduce the sulfate ion concentration.

Another possibility for the removal of sulfate is the use of anion exchange resins which selectively remove the sulfate ions. These exchange sulfate ions with, for example, bromide or chloride ions. However, these resins are costly and at present they are not very selective and may remove bromide ions in addition to sulfate ions. They also require periodic regeneration which is a costly process. U.S. Pat. No. 4,556,463 shows the use of an anion exchange medium to remove the sulfate ion prior to returning the solution to the cell.

U.S. Pat. No. 4586993 shows the use of calcium salt addition to form a precipitate of calcium sulfate followed by the use of an ion exchange column as described above.

U.S. Pat. No. 5,587,033 discloses a nanofiltration process for selectively removing multivalent ions from aqueous solution. However, as with ion exchange resins the selectivity is not perfect and considerable amounts of bromide are still lost in the process.

Another possibility for removal of sulfate ions is the crystallisation and separation of a sulfate salt such as sodium sulfate. EP 498919 discloses the use of combinations of refrigeration and crystallisation, and brine recirculation techniques in systems to make brine for electrolysis, which techniques reduce the sulfate ion content of depleted brine. DE 3216418 discloses a process for the cooling and refrigeration of a side-stream of depleted brine so as to crystallise sodium sulfate from the solution. SU 1520012 discloses a process for removing sodium sulfate from brine wherein the brine is subjected to alkali treatment to pH 7.5–9.0 and saturation with NaCl, to bring the ratio of sulfate to chloride to 1:(3–6). Then it is cooled to –20° C. and the crystals of sodium sulfate obtained are separated. However, the crystallisation techniques described in the prior art all involve cooling the sulfate contaminated solution which represents a considerable expense.

It is an object of the present invention to provide a method for the removal of sulfate ions from a halogen/halide electrolyte which addresses the problems associated with the prior art.

It is a further object of the present invention to provide a method for the removal of sulfate ions from the halogen/halide electrolyte of a halogen/halide sulfide/polysulfide electrochemical reduction-oxidation system in which the sulfate ions are a contaminant or interferant wit in the halogen/halide electrolyte without interrupting the normal operation of sale system.

Accordingly, the present invention provides a method for the removal of sulfate ions from an electrolyte of an electrochemical reduction-oxidation system wherein said electrolyte comprises a halogen and in which the sulfate ions are a contaminant or interferant, which method comprises the steps of:

(i) increasing the halide concentration in the electrolyte by electrochemical reduction of the halogen, (ii) crystallising a sulfate salt out of the electrolyte, and (iii) separating the electrolyte from the crystallised sulfate salt.

Increasing the halide concentration in the electrolyte in step (i) decreases the solubility of the sulfate salt in the electrolyte and therefore promotes the crystallisation of the sulfate salt in step (ii).

The maximum halide concentration attainable will depend on the halogen content of the electrolyte, however, it is preferable that the halide concentration be increased to at least approximately 4M, preferably approximately 5M, and most preferably approximately 6M.

Preferably, before or during step (ii), a seed crystal is added to the electrolyte. In the presence of a seed crystal the sulfate crystallises into relatively large crystals of the sulfate salt which are easier to separate and can be washed free of any bromide contained in the mother liquors. In the absence of a seed crystal, crystallisation does occur but it takes place by spontaneous nucleation which is less desirable and produces smaller crystals which are more difficult to separate. Also, in the absence of a seed crystal, crystallisation tends to occur on the surfaces of the apparatus causing scaling rather than occurring within the body of the electrolyte so as to produce a suspension of crystals in the electrolyte.

Preferably, after step (i), the pH of the electrolyte is adjusted. The solubility of the sulfate salt in an electrolyte containing halide ions is dependent upon the pH and appropriate adjustment results in a more efficient crystallisation process in step (ii). Preferably, the pH is adjusted to a value greater than 1. It is preferable for the pH to be greater than 1 because below this point significant numbers of sulfate ions are protonated to form the more soluble bisulfate ions, thus reducing the efficiency of the crystallisation process in step (ii). More preferably, the pH is increased to a value greater than or equal to 7. It is preferable for the pH to be increased to a value greater than or equal to 7 because this reduces the corrosive nature of the electrolyte and results in less damage to the crystalliser and other equipment which necessarily comes into contact with the electrolyte.

In a preferred embodiment of the process the pH may be increased by continuing electrochemical reduction of the electrolyte obtained after all of the halogen has been reduced to halide ions at a voltage sufficient to cause electrochemical reduction of water in the electrolyte. The electrochemical reduction of water may occur according to the reaction scheme below resulting in the generation of OH⁻ ions, thus raising the pH of the electrolyte:

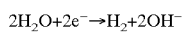

$$2H_2O + 2e^- \rightarrow H_2 + 2OH^-$$

In another embodiment, prior to and/or during step (ii), the electrolyte is cooled to a temperature within the range of from 0 to 20° C., preferably from 5 to 15° C. and most preferably from 10 to 15° C. Cooling the electrolyte further decreases the solubility of the sulfate salt promoting its crystallisation in step (ii). Cooling may be effected by a standard heat exchange apparatus.

Step (ii) is preferably carried out using a standard crystallisation tank.

Step (iii) may be effected by filtration or by the use of a hydrocyclonic separator or a centrifuge.

Preferably, the sulfate salts is crystallised as an alkali metal sulfate. In the case where the sulfate salt is sodium sulfate, crystallisation occurs as the decahydrate, i.e. $Na_2SO_4.10\ H_2O$. This is particularly advantageous in terms of the process water balance. Since water is removed during crystallisation, this allows the crystals to be washed free of residual sodium halide using the water necessary to replenish the process electrolyte. This serves to minimise halide ion loss from the electrolyte. Preferably the water used to wash the crystals is cold, preferably from 0–15° C. This minimises the resolvation of sodium sulfate during washing.

In a further embodiment, the present invention also includes a method wherein the sulfate ion concentration of the halogen/halide electrolyte may be monitored. Preferably this is accomplished by means of chromatographic techniques or barium sulfate precipitation measurements.

In a particularly preferred embodiment of the present invention the method is performed on a portion of the total halogen/halide electrolyte volume. This embodiment is preferred because it enables the main system to remain operational whilst the process of sulfate removal is taking place. In this embodiment, step (i) is effected or completed by substantially completing the reduction of the halogen in an external electrochemical reduction-oxidation system so as t0 substantially maximise the halide concentration in said portion of the total halogen/halide electrolyte volume. This embodiment is particularly preferred when the method is applied to electrochemical reduction-oxidation systems which are subject to repeated charge and discharge cycles. This is because, whilst it is desirable that the halide concentration should be maximised in order to minimise sulfate solubility, it is also desirable that the electrolytes within the main system should not be totally discharged because the main system works more efficiently when the charge and discharge cycles are not taken to completion. Also it is desirable that the crystallisation and separation steps be conducted in the absence of any elemental halogen which would cause environmental concerns. In order to ensure complete reduction of the halogen present in the halogen/halide electrolyte it may be necessary to pass it through the external electrochemical reduction-oxidation system a number of times.

Preferably, the amount of halogen/halide electrolyte removed is less than approximately 2% of the total halogen/halide electrolyte volume. More preferably the amount of halogen/halide electrolyte removed is in the range of from 0.1 to 1% of the total halogen/halide electrolyte volume.

The method of the present invention may advantageously be applied to the removal of sulfate ions from the halogen/halide containing electrolyte of a halogen/halide-sulfide/polysulfide electrochemical reduction-oxidation system as described above and in U.S. Pat. No. 4,485,154. In this case step (i) may be effected partially or completely by the normal discharge cycle of said system. During the discharge cycle equation moves from left to, right and consequently the concentration of halide in the halogen/halide electrolyte increases. When the method of removing a portion of halogen/halide electrolyte is applied to the removal of sulfate ions from the halogen/halide containing electrolyte of a halogen/halide-sulfide/polysulfide electrochemical reduction-oxidation system, said halogen/halide electrolyte is preferably removed from the main stream of halogen/halide electrolyte at a time close to the end of a discharge cycle of said system. At this point the halide concentration is already close to its maximum value so less reduction will be necessary in the external cell. Preferably, the portion of halogen/halide electrolyte is removed when the halogen concentration of the electrolyte has been reduced by the discharge cycle of a halogen/halide-sulfide/polysulfide electrochemical reduction-oxidation system to a value in the range of from 0.1 to 0.5M, more preferably to a value of approximately 0.2M.

In the case where the present invention is applied to a halogen/halide-sulfide/polysulfide electrochemical reduction-oxidation system as the main system, an external electrochemical reduction-oxidation cell may advantageously be employed with the halogen/halide electrolyte being supplied to the anolyte chamber of said external cell where it may be electrochemically reduced to increase the halide concentration. The identity of the electrolyte being supplied to the catholyte chamber of said external cell so as to complete the electrochemical reaction is not critical to the invention. However, in a preferred embodiment the electrolyte being supplied to the catholyte chamber may be a sulfide/polysulfide electrolyte. In this. embodiment or sulfide/polysulfide electrolyte from the main system may also be circulated within the external cell, thus removing the need for a separate source of electrolyte for the other half of the external cell.

Alternatively, in another preferred embodiment, the electrolyte being supplied to the catholyte chamber may comprise the halogen/halide electrolyte resulting, from step (iii) of the process of the present invention. That is, the desulfated halogen/halide electrolyte solution is returned to the catholyte chamber of the external electrochemical cell. This results in oxidation of some of the halide back to halogen and therefore partially recharges the halogen/halide electrolyte prior to returning it to the main system.

Alternatively, in another preferred embodiment, the electrolyte being supplied to the catholyte chamber may comprise halogen/halide electrolyte taken directly from the main system. That is, halogen/halide electrolyte solution is drawn from the main system and passed into the catholyte chamber of the external electrochemical cell. This results in oxidation of some of the halide to halogen and therefore partially recharges the halogen/halide electrolyte prior to returning it to the main system. This is particularly advantageous in a halogen/halide-sulfide/polysulfide electrochemical reduction-oxidation system because it helps to rebalance the relative state of charge of the electrolytes circulating within the main system.

The present invention also includes within its scope an electrochemical process for energy storage and/or power delivery comprising the steps of:

(i) maintaining and circulating electrolyte flows in a fully liquid system in which the active constituents are fully soluble in a single. cell or in an array of repeating cell structures, each cell with a chamber (+ve chamber) containing an inert +ve electrode and a chamber (–ve chamber) containing an inert –ve electrode, the chambers being separated from one another by an ion exchange membrane, the electrolyte circulating in the –ve chamber of each cell during power delivery containing a sulfide, and the electrolyte circulating in the +ve chamber during power delivery containing bromine as an oxidising agent, (ii) restoring or replenishing the electrolytes in the +ve and –ve chambers by circulating the electrolyte from each chamber to storage means comprising a volume of electrolyte greater than the cell volume for extended delivery of power over a longer discharge cycle than the cell volume alone would permit, and (iii) treating the electrolyte stream containing bromine as an oxidising agent in order to remove sulfate ions from the electrolyte stream.

Preferably, the electrolyte stream containing bromine as an oxidising agent is treated according to the method as defined above in order to remove sulfate ions from the electrolyte stream.

The present invention will be further described with reference to the accompanying drawings in which.

Figure 1A:
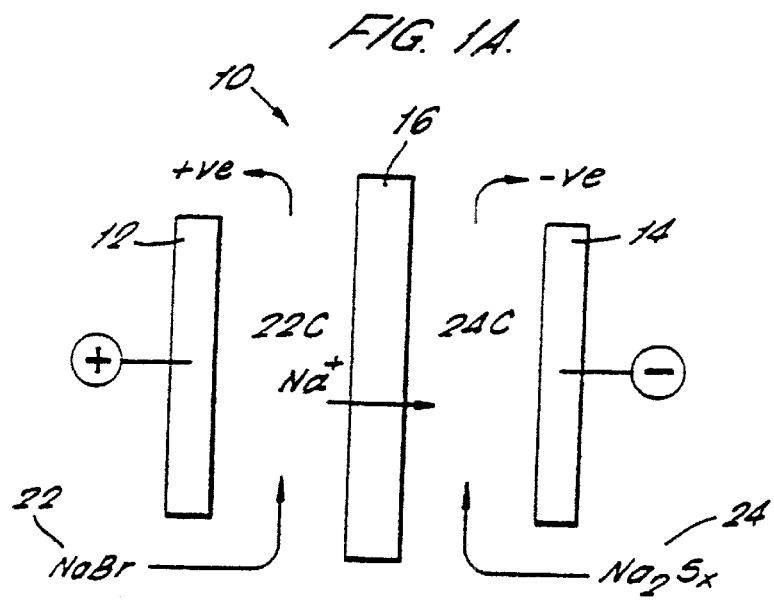
FIG. 1A is a schematic view of a basic electrochemical reduction-oxidation cell in which a sulfide/polysulfide reaction is carried out in one half of the cell and a bromine/bromide reaction is carried out in the other half of the cell.

FIG. 1A shows a cell 10 with a positive ($+^{ve}$) electrode 12 and a negative ($-^{ve}$) electrode 14 and a cation membrane 16 formed from a fluorocarbon polymer with sulfonic acid functional groups to provide charge carriers. The membrane 16 acts to separate the $+^{ve}$ and $-^{ve}$ sides of the cell 10 and is selected to minimize migration of bromine from the $+^{ve}$ side to the $-^{ve}$ side and to minimize migration of $S^{2-}$ ions from the $-^{ve}$ side to the $+^{ve}$ side. An aqueous solution 22 of NaBr is provided in a chamber 22C formed between $+^{ve}$ electrode 12 and membrane 16 and an aqueous $Na_2S_x$ solution 24 is provided in a chamber 24C formed between the $-^{ve}$ electrode 14 and the membrane 16. A $K_2S_x$ solution, which is more soluble and more expensive than the $Na_2S_x$ solutions, is used in another embodiment.

When the cell is in the discharged state, a solution of NaBr of up to 6.0 molar concentration exists in the chamber 22C of the cell and a solution of $Na_2S_5$ at 0.5 to 1.5 molar, exists in chamber 24C of the cell. Higher molarity is possible with $K_2S_5$.

As the cell is charged, $Na^+$ ions are transported through the cation membrane 16, as shown in FIG. 1A from $+^{ve}$ to the $-^{ve}$ side of the cell. Free bromine is produced via oxidation of the bromide ions at the $+^{ve}$ electrode and dissolves as a tribromide or pentabromide ion. Sulfur is reduced at the $-^{ve}$ electrode and the pentasulfide, $Na_2S_5$, salt eventually becomes the monosulfide as the charging proceeds to completion. At the $+^{ve}$ side the following reaction occurs,

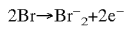

and at the $-^{ve}$ side the following reaction occurs,

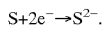

The membrane separates the two electrolytes and prevents bulk mixing and also retards the migration of sulfide ions from the $-^{ve}$ side to the $+^{ve}$ side, and the migration of $Br^-$ and $Br_2$ from the $+^{ve}$ to the $-^{ve}$ side. Diffusion of the sulfide ions results in coulombic loss and results in the oxidation of some of the sulfide content of the system to sulfate ions. It is these sulfate lops which are unwanted and which are removed in accordance with the method of the present invention.

when providing power, the cell is discharging. During this action, reversible reactions occur at the two electrodes. At the $+^{ve}$ side electrode 12, bromine is reduced to $Br^-$, and at the $-^{ve}$ electrode, the $S^{2-}$, ion is oxidized to molecular S. The electrons produced at the $-^{ve}$ electrode form the current through a load. The chemical reaction at the $+^{ve}$ electrode produces 1.06 to 1.09 volts and the chemical reaction at the $-^{ve}$ electrode produces 0.48 to 0.52 volts. The combined chemical reactions produce an open circuit voltage of 1.54 to 1.61 volts per cell.

The energy density of the bromine/sulfur couple will be limited by the permissible maximum concentration of the $Br_2$ $_n$ $_{the}$ $_+^{ve}$ side, not by the solubilities of the constituent salts, such as NaBr and $Na_2S$, which are high.

The reacting ions are $S^{2-}$ and $Br^-$ going back and forth to the elemental stage during the oxidation/reduction processes. The cation which is associated with them essentially takes no part in the energy producing process. Hence, a cation of "convenience" is chosen. Sodium or potassium are preferred choices. Sodium and potassium compounds are plentiful, they are inexpensive oral have high water solubilities. Lithium and ammonium salts are also possibilities, but at higher costs.

Figure 1B:
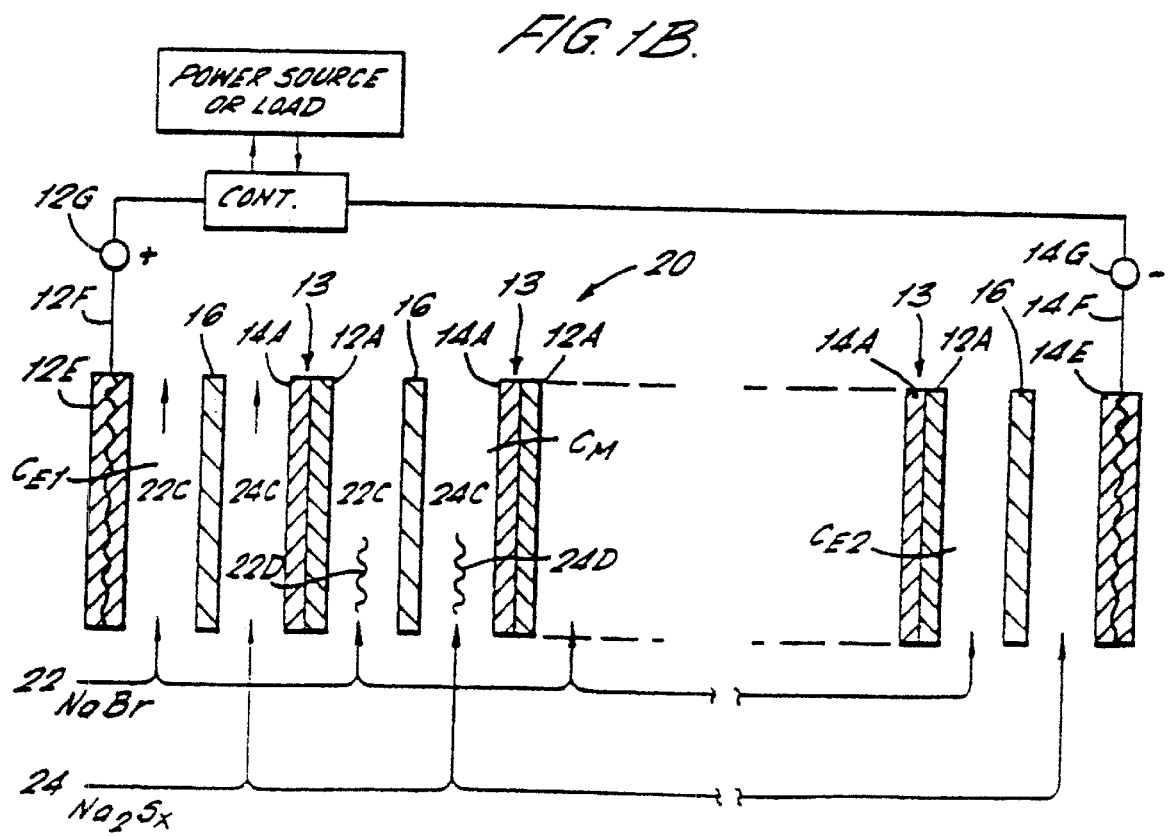
FIG. 1B is a diagram of cell arrays using the system of FIG. 1A.

FIG. 1B shows an array 20 of multiple cells connected in electrical series and fluid parallel. Multiple mid-electrodes 23 (each one having a $+^{ve}$ electrode side 12A and $-^{ve}$ electrode side 14A) and end electrodes 12E ($+^{ve}$) and 14E ($+^{ve}$) are spaced out from each other by membranes 16 and screen or mesh spacers (22D, 24D) in all the cell chambers 22C, 24C, (portions of two of which 22D, 24D are shown by way of example) to form end cells $C_{E1}$ and $C_{E2}$ and an array of mid cells $C_M$ (typically 10–20; but note much smaller and much higher numbers of cells can be accommodated). The end electrodes 12E ($+^{ve}$) and 14E ($-^{ve}$) have internal conductors 12F and 14F (typically copper screens) encapsulated therein and leading to external terminals 12G, 14G which are connected to external loads (e.g. to motor(s) via a control circuit (CONT), the motor(s) driving a vehicle) or power sources (e.g. utility power grid when used as a load-leveling device).

Figure 2:
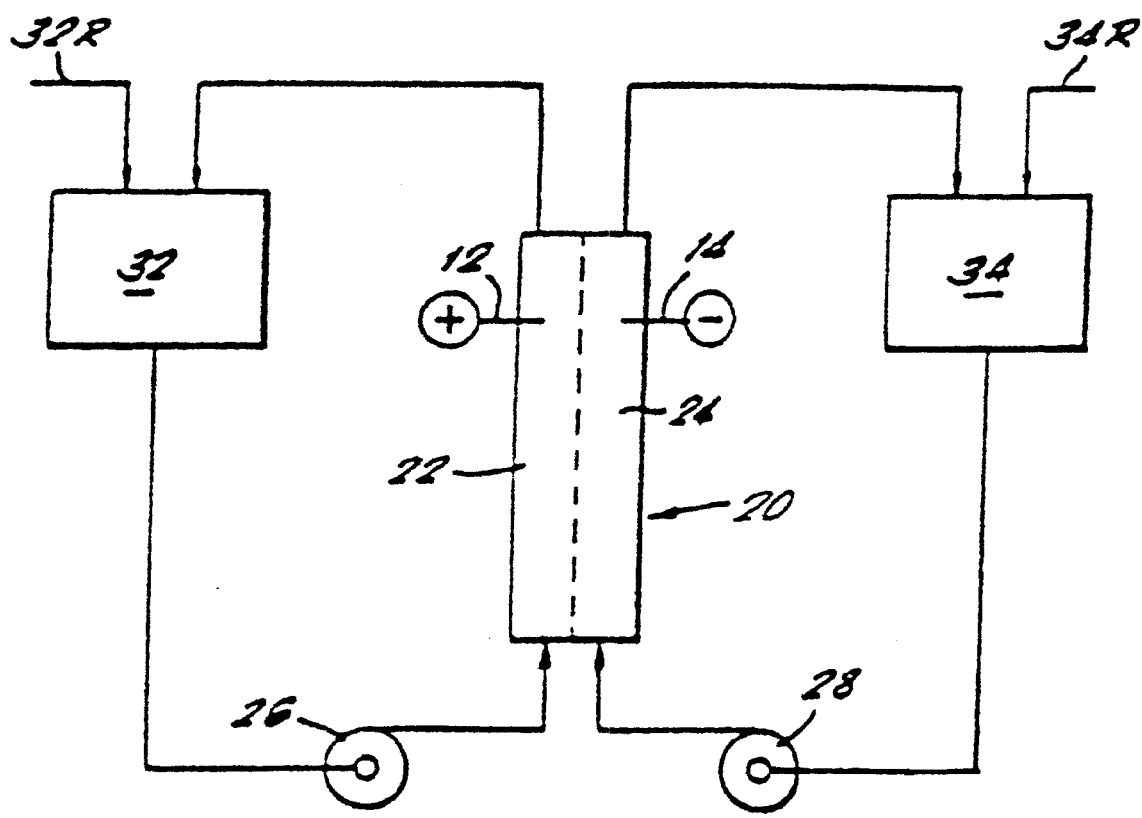
FIG. 2 is a block diagram of a fluid flow system using the cell of FIG. 1A

FIG. 2 shows a free flow system, a power generation/storage system utilizing one or more of the batteries or cell array formats 20. Each cell 20 receives electrolyte through pumps 26 and 28 for the NaBr and $Na_2S_5$ solutions (22 and 24, respectively). The electrolytes 22 and 24 are stored in containers 32 and 34. The tanks 32, 34 can be replaced with freshly charged electrolyte by substituting tanks containing fresh electrolyte and/or refilling them from charged supply sources via lines 32R, 34R with corresponding lines (not shown) provided for draining spent (discharged) reagent. The electrolytes 22 and 24 are pumped from tanks 32 and 34, respectively, into the respective chambers 22C and 24C by means of pumps 26 and 28.

Figure 3:
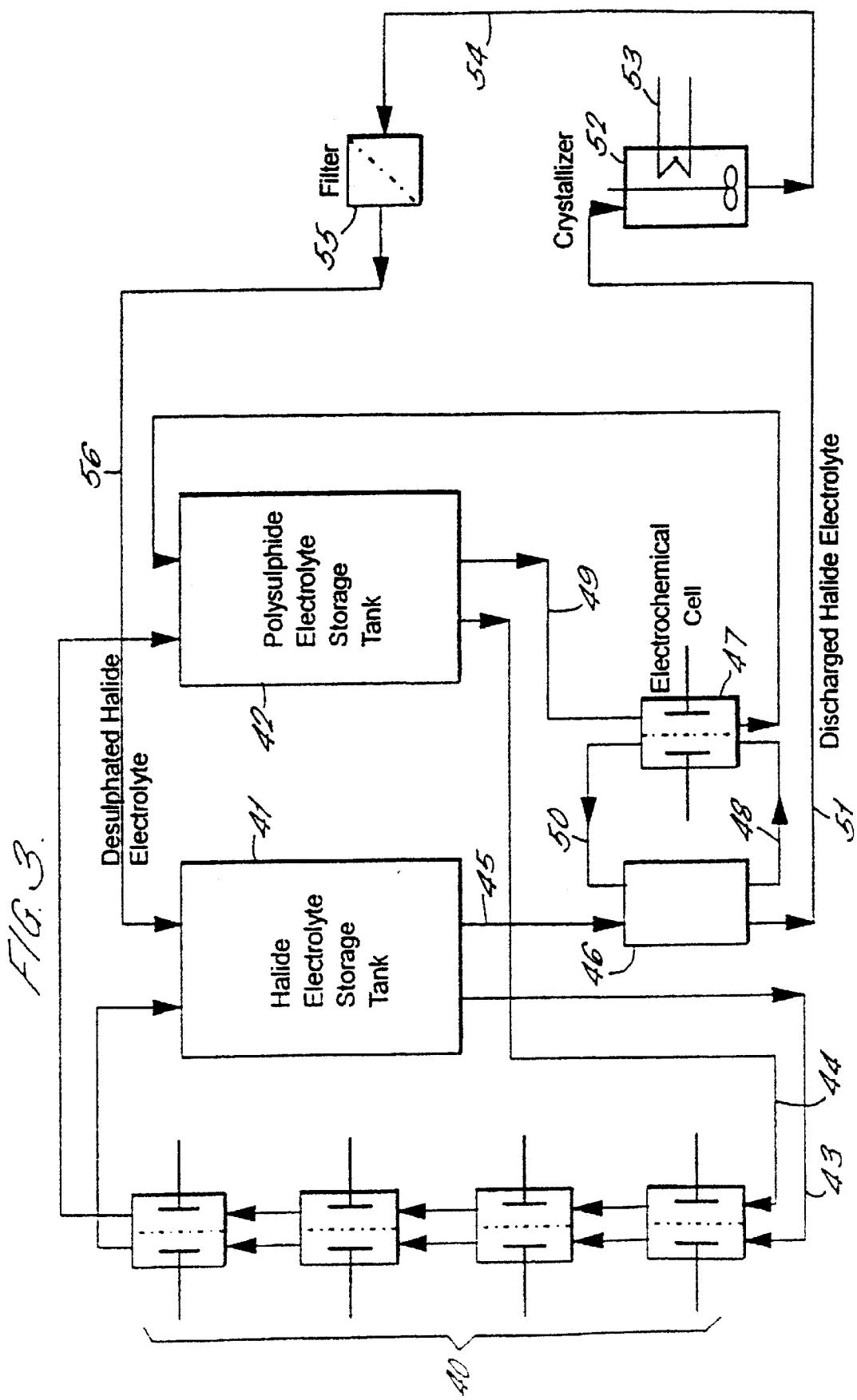
FIG. 3 is a flow diagram of an apparatus for carrying out a preferred embodiment of the method of the present invention.

FIG. 3 snows a free flow system in which an array of cells 40 are supplied with halide/halogen and polysulfide/sulfide electrolyte from storage tanks 41 and 42 via lines 43 and 44. Halide/halogen electrolyte contaminated with sulfate ions may be removed from the main system via line 45 which transfers it to a holding tank 46. The halide ion concentration of the electrolyte is increased by transferal to electrochemical cell 47 via line 48 where halogen within the electrolyte is reduced to halide ions. In the illustrated embodiment the other half cell reaction involves oxidation of sulfide to polysulfide and the electrolyte for this reaction is supplied from storage tank 42 via line 44. The discharged halide/halogen electrolyte is returned to tank 46 via line 50. The passage ,of halide/halogen electrolyte through the cell 47 is repeated until substantially all of the halogen in the holding tank has been reduced to give a discharged halide/halogen electrolyte with substantially no halogen present. The discharged halide/halogen electrolyte is then transferred via line 51 to a crystallizes 52 which may optionally be equipped with a heat exchanger 53 for cooling the electrolyte. The discharged halide electrolyte and suspended sulfate salt crystals are transferred via line 54 to d filter 55 which removes the sulfate salt. The sulfate salt may then be washed with cold water and the desulphated halide/halogen electrolyte is then returned via line 56 to storage tank 41.

Figure 4:
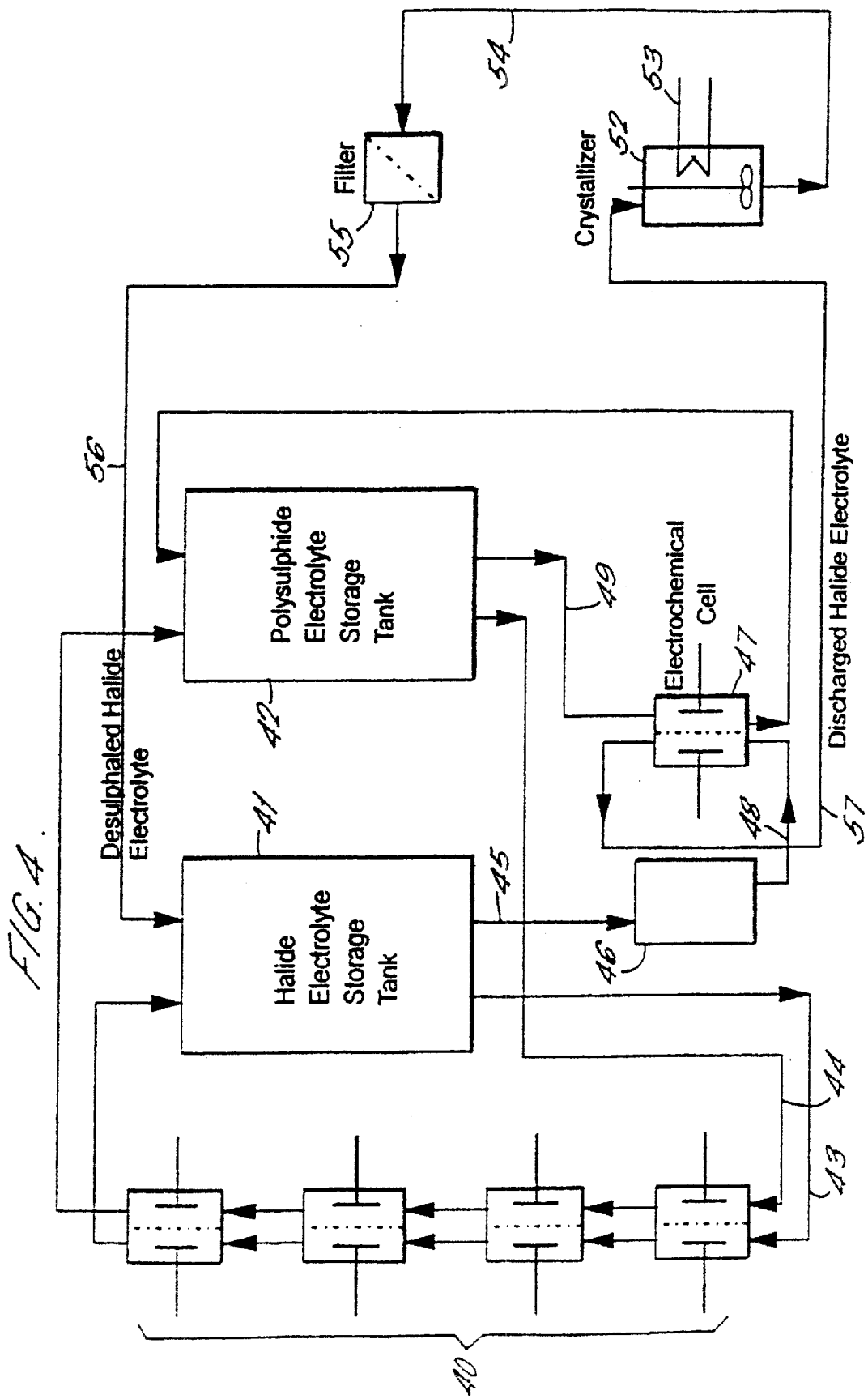
FIG. 4 is a flow diagram of an apparatus for carrying out a preferred embodiment of the method of the present invention.

FIG. 4 shows a free flow system which is essentially the same as FIG. 3 but in which lines 50 and 51 are not present and in their place is included a line 57 leasing directly from the electrochemical cell 47 to the crystallizer 52. Thus, rather than being recycled through the holding tank 46 and electrochemical cell 47 several times before being transferred to the crystallizes 52, the halide/halogen electrolyte makes just one pass through the electrochemical cell 47 On its way to the crystallizes 52.

Figure 5:
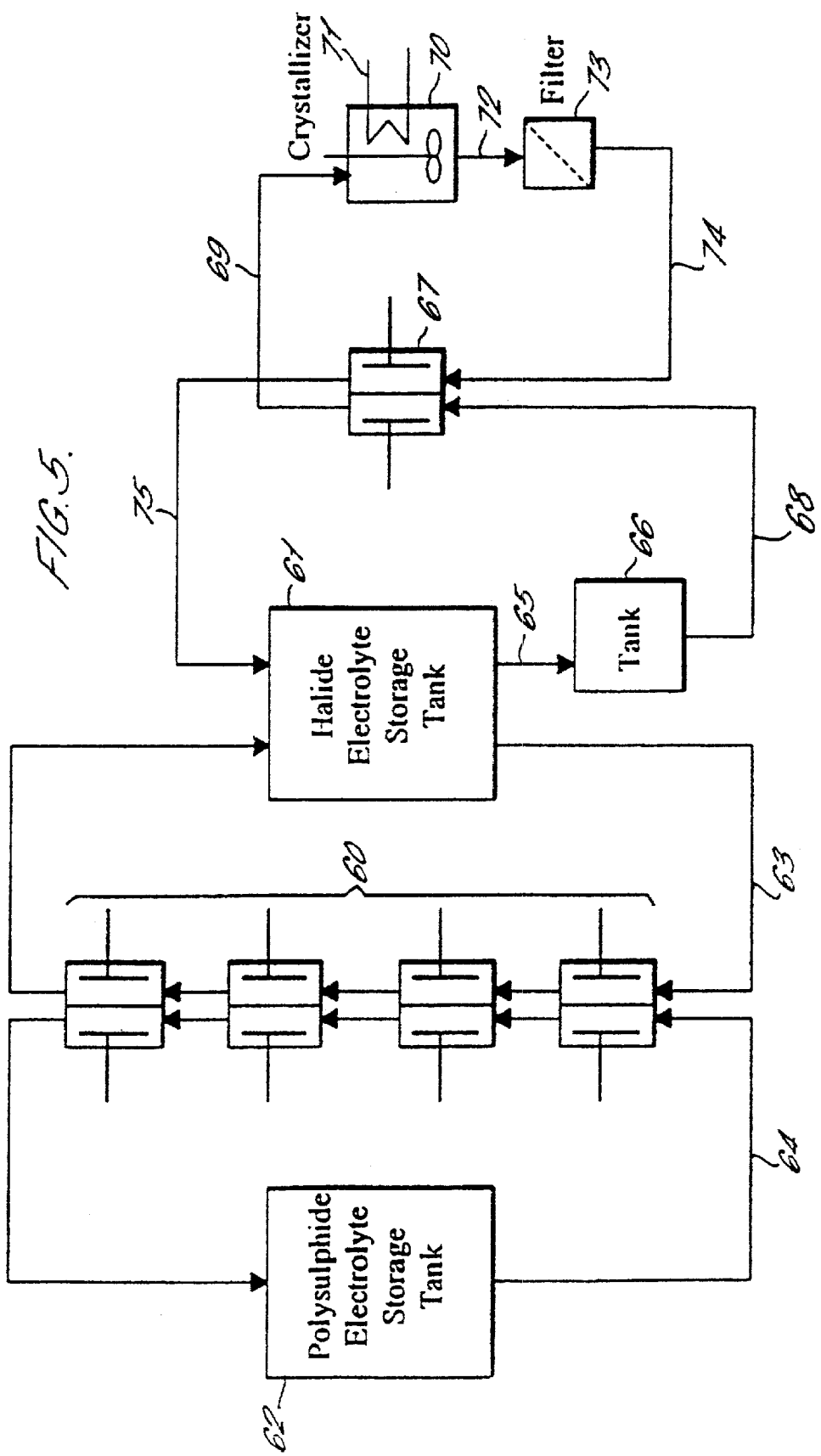
FIG. 5 is a flow diagram of an apparatus for carrying out a preferred embodiment of the method of the present invention.

FIG. 5 snows an alternative free flow system in which an array of cells 64 is supplied with halide/halogen and polysulfide/sulfide electrolyte from Storage tanks 61 and 62 via lines 63 and 64. Halide/halogen electrolyte contaminated with sulfate ions may be removed from the main system via line 65 which transfers it to a holding tank 66. The halide ion concentration of the electrolyte is increased by transferal to the anolyte chamber of electrochemical cell 67 via line 68 where halogen within the electrolyte is electrochemically reduced to halide ions. The discharged halide/halogen electrolyte is then transferred via line 69 to a crystallizer 70 which may optionally be equipped with a heat exchanger 71 for cooling the electrolyte. The discharged halide electrolyte and suspended sulfate salt crystals are transferred via line 72 to a filter 73 which removes the sulfate salt. The desulphated halide/halogen electrolyte is then returned via line 74 to the catholyte chamber of the electrochemical cell 67 wherein at least some of the halide ions present are oxidised to halogen molecules by the same electrochemical reaction which was used to reduce halogen molecules to halide ions on its first pass through the anolyte chamber of the electrochemical cell 67. The partially charged and desulfated halide/halogen electrolyte is then returned via line 75 to storage tank 61.

Figure 6:
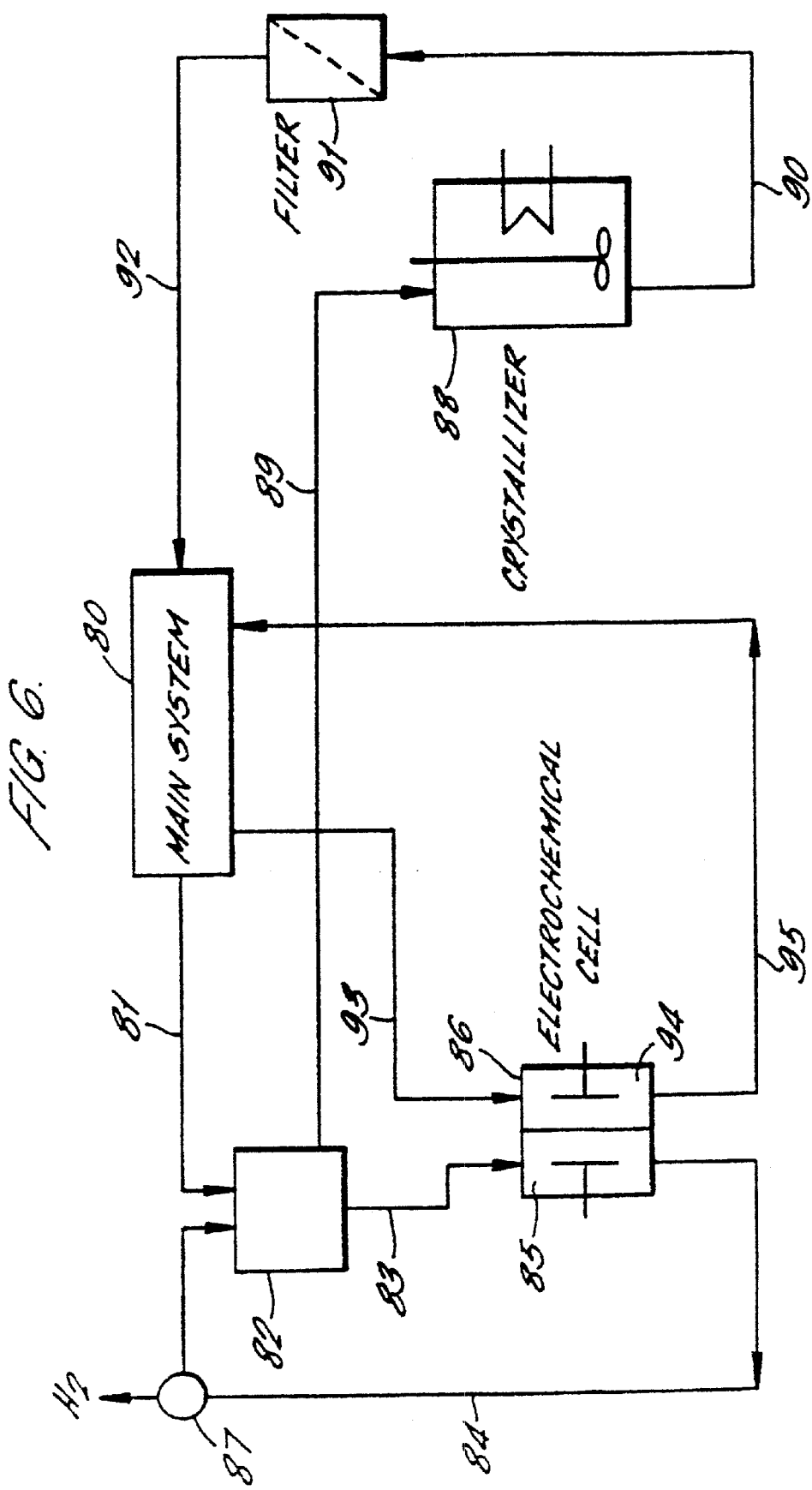
FIG. 6 is a flow diagram of an apparatus for carrying out a preferred embodiment of the method of the present invention.

FIG. 6 shows an alternative external electrochemical oxidation-reduction system for use in accordance with the present invention. In this system a portion of halide/halogen electrolyte contaminated with sulfate ions is drawn from the main system 80 via line 81 and held in a receiving tank 82. This electrolyte is then circulated via lines 83 and 84 through the anolyte chamber 85 of the external electrochemical cell 86 until substantially all the halogen present in the electrolyte has been reduced to halide ions. When the current density has run down (thus indicating that the conversion of halogen to halide is substantially complete), the voltage applied to the cell 86 is increased to a value sufficient to cause reduction of the water present in the electrolyte so as to generate $H_2$ gas and $OH^-$ ions, thereby increasing the pH of the halide/halogen electrolyte. The removal of water from the electrolyte further increases the concentration of halide ions thereby reducing the sulphate solubility and increasing the yield of sulphate on crystallisation. A tap 87 is provided to draw off $H_2$ gas. When the desired pH is reached the electrolyte is passed from the receiving tank 82 to the crystalliser 88 via line 89. The halide/halogen electrolyte is then passed via line 90 through a filter 91 to remove the sulphate crystals and then it may be returned to the main system via line 92. The identity of the electrolyte which passes through the catholyte chamber of the external electrochemical cell is not critical to the present embodiment. However, when it is applied to a halogen/halide-sulfide/polysulfide electrochemical reduction-oxidation system, the electrolyte which passes through the catholyte chamber of the external cell may preferably be either sulfide/polysulfide electrolyte drawn from the main system or halogen halide electrolyte drawn from the main system or desulphated halogen/halide electrolyte which has been treated according to the present invention prior to its return to the main system. The embodiment shown in FIG. 6 simply shows an electrolyte been drawn from the main system via line 93, passing through the catholyte chamber 94 of the external electrochemical cell and returning to the main system via line 95.

The present invention will be further described with reference to the following example:

EXAMPLE 1

An electrochemical cell was set up with 5 liters of sulfide-polysulfide electrolyte (starting as 0.75M $Na_2S_5$) in one half and 5 liters of bromine-bromide electrolyte (starting as 5M NaBr) in the other. This was charged and discharged for nine cycles over a two month period, during which time the sulphate concentration in the bromine-bromide electrolyte increased from 300 mM to over 700 mM. On the last cycle the bromine-bromide electrolyte was completely discharged in order to maximise the bromide concentration. After a number of hours standing at room temperature, small crystals formed in the bromine-bromide electrolyte. Three liters of this solution was then filtered and 52 grams of precipitate were collected. These were analysed using ion chromatography and ware found to contain 54% sodium sulphate decahydrate, 26% sodium bromide and 20% water.

What is claimed is:

1. A method for the removal of sulfate ions from an electrolyte of an electrochemical reduction-oxidation system wherein said electrolyte comprises a halogen and in which the sulfate ions are a contaminant or interferant, which method comprises the steps of:
   (i) increasing the halide concentration in the electrolyte by electrochemical reduction of the halogen,
   (ii) crystallising a sulfate salt out of the electrolyte, and
   (iii) separation of the electrolyte from the crystallised sulfate salt.
2. A method according to claim 1 wherein the halide concentration is increased to at least approximately 4M.
3. A method according to claim 1 wherein the halide concentration is increased to at least approximately 5M.
4. A method according to claim 1 wherein the halide concentration is increases to at least approximately 6M.
5. A method according to claim 1 wherein a seed crystal of the sulfate salt is added to the electrolyte before or during step (ii).
6. A method according to claim 1 wherein the pH of the electrolyte is adjusted after step (i).
7. A method according to claim 6 wherein the pH of the electrolyte is adjusted to a value greater than 1.
8. A method according to claim 6 wherein the pH of the electrolyte is adjusted to a value greater than or equal to 7.
9. A method according to claim 6 wherein the pH is adjusted by electrochemical reduction of water to form hydroxide ions.
10. A method according to claim 1 wherein before and/or during step (ii) the electrolyte is cooled.
11. A method according to claim 10 wherein before and/or during step (ii) the electrolyte is cooled to a temperature in the range of from 0 to 20° C.
12. A method according to claim 10 wherein before and/or during step (ii) the electrolyte is cooled to a temperature in the range of from 5 to 15° C.
13. A method according to claim 10 wherein before and/or during step (ii) the electrolyte is cooled to a temperature in the range of from 10 to 15° C.
14. A method according to claim 1 wherein the removal of the sulfate salt in step (iii) is effected by filtration or by use of a hydrocyclonic separator or a centrifuge.
15. A method according to claim 1 wherein the residual sulfate salt is washed with water which is then returned to the electrolyte.
16. A method according to claim 15 wherein the temperature of the water is in the range of from 0 to 15° C.
17. A method according to claim 1 wherein the sulfate salt is an alkali metal sulfate.
18. A method according to claim 1 wherein the sulfate salt is sodium sulfate.
19. A method according to claim 1 wherein the electrolyte is monitored for sulfate ion concentration.
20. A method according to claim 19 wherein the v electrolyte is monitored for sulfate ion concentration by means of chromatographic techniques or barium sulfate precipitation measurements.
21. A method according to claim 1 wherein the electrolyte is the halogen/halide electrolyte of a halogen/halide-sulfide/polysulfide electrochemical reduction-oxidation system and step (i) is effected partially or completely by the normal discharge cycle of said system.
22. A method according to claim 1 wherein the halogen/halide electrolyte is a portion of the total halogen/halide electrolyte volume which has been removed therefrom.
23. A method according to claim 22 wherein the portion of the halogen/halide electrolyte removed is less than approximately 2% of the total halogen/halide electrolyte volume.
24. A method according to claim 22 wherein the portion of the halogen/halide electrolyte removed is in the range of from 0.1 to 1% of the total halogen/halide electrolyte volume.
25. A method according to claim 22 wherein step (i) takes place in an external electrochemical reduction-oxidation system so as to substantially maximise the halide concentration in the electrolyte.
26. A method according to claim 25 wherein the electrolyte being supplied to the catholyte chamber of the external electrochemical cell is either a sulfide/polysulfide electrolyte, or the electrolyte resulting from step (iii) of the process of the present invention or halogen/halide electrolyte taken directly from the main system.
27. A method according to claim 22 wherein the electrolyte is the halogen/halide electrolyte of a halogen/halide-sulfide/polysulfide electrochemical reduction-oxidation system and said electrolyte is removed from the main stream of electrolyte at a time close to the end of a discharge cycle of said system.
28. A method according to claim 27 wherein the halogen concentration of the electrolyte has been reduced by the discharge cycle of a halogen/halide-sulfide/polysulfide electrochemical reduction-oxidation system to a value in the range of from 0.1 to 0.5M.
29. A method according to claim 27 wherein the halogen concentration of the electrolyte has been reduced by the discharge cycle of a halogen/halide-sulfide/polysulfide electrochemical reduction-oxidation system to a value of approximately 0.2M.
30. An electrochemical process for energy storage and/or power delivery comprising the steps of:
   (i) maintaining and circulating electrolyte flows in a fully liquid system in which the active constituents are fully soluble in a single cell or in an array of repeating cell structures, each cell with a chamber (+ve chamber) containing an inert +ve electrode and a chamber (−ve chamber) containing an inert −ve electrode, the chambers being separated from one another by an ion exchange membrane, the electrolyte circulating in the −ve chamber of each cell during power delivery containing a sulphide, and the electrolyte circulating in the +ve chamber during power delivery containing bromine as an oxidising agent, (ii) restating or replenishing the electrolytes in the +ve and −ve chambers by circulating the electrolyte from each chamber to storage means comprising a volume of electrolyte greater than the cell volume fox extended delivery of power over a longer discharge cycle than the cell volume alone would permit, and (iii) treating the electrolyte stream containing bromine as an oxidising agent according to the method as claimed in any one of claims 1 to 29 in order to remove sulfate ions from the electrolyte stream.

* * * * *